United States Patent
Monros

(10) Patent No.: US 9,051,872 B2
(45) Date of Patent: Jun. 9, 2015

(54) HYDROGEN ON-DEMAND FUEL SYSTEM FOR INTERNAL COMBUSTION ENGINES

(71) Applicant: Serge V. Monros, Costa Mesa, CA (US)

(72) Inventor: Serge V. Monros, Costa Mesa, CA (US)

(*) Notice: Subject to any disclaimer, the term of this patent is extended or adjusted under 35 U.S.C. 154(b) by 0 days.

(21) Appl. No.: 14/168,567

(22) Filed: Jan. 30, 2014

(65) Prior Publication Data

US 2014/0216366 A1 Aug. 7, 2014

Related U.S. Application Data

(60) Provisional application No. 61/759,631, filed on Feb. 1, 2013.

(51) Int. Cl.
| | |
|---|---|
| *F02B 43/08* | (2006.01) |
| *F02B 43/10* | (2006.01) |
| *C25B 15/02* | (2006.01) |
| *F01M 13/02* | (2006.01) |
| *F02M 25/12* | (2006.01) |
| *C25B 1/06* | (2006.01) |
| *C25B 9/06* | (2006.01) |
| *F01M 13/00* | (2006.01) |

(52) U.S. Cl.
CPC ............... *F02B 43/10* (2013.01); *C25B 15/02* (2013.01); *F01M 13/021* (2013.01); *F02M 25/12* (2013.01); *F01M 2013/0022* (2013.01); *C25B 1/06* (2013.01); *C25B 9/06* (2013.01); *Y02E 60/366* (2013.01); *Y02T 10/121* (2013.01); *Y02T 10/32* (2013.01)

(58) Field of Classification Search
CPC ............. C25B 1/04; C25B 1/06; F02B 43/10; F02M 25/12
USPC ............ 123/3, 41.86, 568.15, 548, 572, 573, 123/574

See application file for complete search history.

(56) References Cited

U.S. PATENT DOCUMENTS

| | | | |
|---|---|---|---|
| 1,262,034 A | 4/1918 | Frazer | |
| 2,006,676 A | 7/1935 | Garrett | |
| 4,014,777 A | 3/1977 | Brown | |
| 4,394,230 A | 7/1983 | Puharich | |
| 4,936,961 A | 6/1990 | Meyer | |
| 5,231,954 A | 8/1993 | Stowe | |
| 5,272,871 A * | 12/1993 | Oshima et al. .................. | 60/274 |
| 7,900,611 B2 * | 3/2011 | Okada ............................ | 123/572 |
| 8,075,750 B2 * | 12/2011 | McAlister ...................... | 204/260 |
| 8,360,038 B2 | 1/2013 | Monros | |
| 2006/0075683 A1 | 4/2006 | Klein et al. | |
| 2007/0080071 A1 * | 4/2007 | Perry ............................. | 205/638 |
| 2007/0241033 A1 * | 10/2007 | Stephenson ................... | 208/299 |
| 2010/0038236 A1 * | 2/2010 | Rivera .......................... | 204/270 |
| 2010/0147232 A1 * | 6/2010 | Heath et al. ..................... | 123/3 |
| 2010/0180872 A1 | 7/2010 | Monros | |

(Continued)

FOREIGN PATENT DOCUMENTS

EP 0405919 A1 1/1991

*Primary Examiner* — Lindsay Low
*Assistant Examiner* — Long T Tran
(74) *Attorney, Agent, or Firm* — Kelly & Kelley, LLP

(57) ABSTRACT

An on-demand oxy-hydrogen fuel system includes a oxy-hydrogen generator which is incorporated into a standard internal combustion engine. A microcontroller activates the oxy-hydrogen generator when oxy-hydrogen is needed. The oxy-hydrogen is then mixed with blow-by gases from a PCV valve which are recycled through the intake manifold. The addition of the oxy-hydrogen provides a very efficient fuel source which can dramatically increase fuel efficiency and reduce emissions.

13 Claims, 3 Drawing Sheets

(56) References Cited

U.S. PATENT DOCUMENTS

| | | |
|---|---|---|
| 2010/0276279 A1 | 11/2010 | Arnett et al. |
| 2011/0017607 A1* | 1/2011 | Moon et al. ............... 205/628 |
| 2011/0132751 A1* | 6/2011 | Smedley .................. 204/274 |
| 2011/0147204 A1* | 6/2011 | Leiato et al. .............. 204/272 |
| 2011/0191008 A1* | 8/2011 | McConahay et al. ...... 701/103 |
| 2012/0111734 A1 | 5/2012 | Kramer |
| 2012/0186991 A1* | 7/2012 | Gootblatt ................. 205/628 |
| 2013/0276726 A1* | 10/2013 | Owens ......................... 123/3 |

\* cited by examiner

PRIOR ART

HYDROGEN ON-DEMAND FUEL SYSTEM FOR INTERNAL COMBUSTION ENGINES

BACKGROUND OF THE INVENTION

The present invention generally relates to internal combustion engines. More particularly, the present invention relates to an on-demand electrolytically generated oxy-hydrogen fuel system which is incorporated into the fuel supply system of a standard internal combustion engine.

The basic operation of conventional piston-based internal combustion engines (ICE) varies based on the functional type of combustion process, the number of cylinders and the desired use. For instance, in a traditional two-cycle engine, oil is pre-mixed with fuel and air before the oil-fuel-air mixture is injected into the cylinder, where the oil/fuel/air mixture is ignited. In a typical four-cycle gasoline engine, atomized fuel is pre-mixed with air, compressed by the movement of the piston against the cylinder head, and ignited by a spark plug that causes the fuel to burn. In a diesel engine, fuel and air are pre-mixed, atomized, and injected into the cylinder. However, in a diesel engine there is no spark plug to provide ignition. Instead, the fuel/air mixture is ignited by the combination of heat accumulated by the mass of the cylinder head and compression by the piston. In each type of ICE engine, the piston is pushed downward against the crankshaft by the pressure exerted by the expansion of detonated fuel and air. Exhaust fumes are allowed to exit the cylinder when the rotation of the crankshaft and camshaft opens the exhaust valve. The movement of the piston on the subsequent oscillation creates a vacuum in the cylinder which draws additional fresh oil/fuel/air into the cylinder, thereby simultaneously pushing the remaining exhaust out the exhaust port and driving by-pass gases out of the crankcase through the positive crankcase ventilation (PCV) valve. Momentum drives the piston back into the compression stroke as the process repeats itself.

In a diesel or gasoline powered engine, as opposed to a two-stroke engine, oil lubrication of the crankshaft and connecting rod bearings is supported by an oil distribution system that is separated from the fuel/air mixture. In a diesel or gasoline powered engine, the fuel/air mixture in the intake manifold is drawn into the combustion chamber where it is ignited by either spark plugs (in a gasoline engine) or compression. The combustion chamber in both gasoline and diesel engines is largely isolated from the crankcase by a set of piston rings that are disposed around an outer diameter of each piston within each piston cylinder. The seals are included in the design of the engine as a way of containing the pressure exerted by each ignition event and forcing the exhaust gases to exit via the exhaust port rather than allowing the hot, pressurized gases to escape into the crankcase.

Unfortunately, the piston rings are unable to completely isolate and contain the pressurized exhaust gases. Consequently, small amounts of crankcase oil intended to lubricate the cylinder are instead drawn into the combustion chamber and burned during the combustion process. This is true in both gasoline and diesel powered engines. Additionally, combustion waste gases comprising unburned fuel and exhaust gases in the combustion chamber simultaneously pass the piston rings and enter the crankcase. The waste gases entering the crankcase are commonly referred to as "blow-by" or "blow-by gas". Blow-by gases mainly consist of contaminants such as hydrocarbons (unburned fuel), carbon dioxide and/or water vapor, all of which serve to contaminate the oil held in the engine crankcase. The quantity of blow-by gases which leak into the crankcase can be several times that of the concentration of hydrocarbons in the intake manifold. Simply venting these gases to the atmosphere increases air pollution.

Alternatively, trapping the blow-by gases in the crankcase allows the contaminants to condense and accumulate over time in the engine crankcase. Condensed contaminants form corrosive acids and sludge in the interior of the components. This decreases the ability of the engine oil in the crankcase to lubricate the cylinder and crankshaft. Degraded oil that fails to properly lubricate the crankshaft components (e.g. the crankshaft and connecting rods) can contribute to accelerated wear and tear in the engine, resulting in degraded engine performance. Inadequate crankcase lubrication contributes to degradation of the piston rings, which reduces the effectiveness of the seal between the combustion chamber and the crankcase.

As the engine ages, the gaps between the piston rings and cylinder walls increase, resulting in larger quantities of blow-by gases entering the crankcase. Excessive blow-by gases in the crankcase results in power loss and eventual engine failure. Condensed water vapor carried by the blow-by gases can condense inside the engine, causing engine parts to rust. In 1970, the United States Environmental Protection Agency mandated the introduction of crankcase ventilation systems to mitigate volume of blow-by gases allowed to build up in the crankcase. In general, crankcase ventilation systems evacuate blow-by gases from the crankcase via a device referred to as a positive crankcase ventilation (PCV) valve. In modern engines, blow-by gases are scavenged from the crankcase and re-routed back into the intake manifold to be re-burned.

The PCV valve re-circulates (i.e. vents) blow-by gases from the crankcase back into the intake manifold to be burned again with a fresh supply of air/fuel during subsequent combustion cycles. This is particularly desirable as the harmful blow-by gases are not simply vented to the atmosphere.

As part of an effort to combat smog in the Los Angeles basin, the State of California started requiring emission control systems on all model cars starting in the 1960s. The Federal Government extended these emission control regulations nationwide in 1968. Congress passed the Clear Air Act in 1970 and established the Environmental Protection Agency (EPA). Since then, vehicle manufacturers have had to meet a series of graduated emission control standards for the production and maintenance of vehicles. This involved implementing devices to control engine functions and diagnose engine problems. More specifically, automobile manufacturers started integrating electrically controlled components, such as electric fuel feeds and ignition systems. Sensors were also added to measure engine efficiency, system performance and pollution. These sensors were capable of being accessed for early diagnostic assistance.

On-Board Diagnostics (OBD) refers to early vehicle self-diagnostic systems and reporting capabilities developed and installed in automobiles by manufacturers. OBD systems provide current state information for various vehicle subsystems. The quantity of diagnostic information available via OBD has varied widely since the introduction of on-board computers to automobiles in the early 1980s. OBD originally illuminated a malfunction indicator light (MIL) for a detected problem, but did not provide information regarding the nature of the problem. Modern OBD implementations use a standardized high-speed digital communications port to provide real-time data in combination with standardized series of diagnostic trouble codes (DTCs) to facilitate rapid identification of malfunctions and the corresponding remedies from within the vehicle.

The California Air Resources Board (CARB or simply ARB) developed regulations to enforce the application of the first incarnation of OBD (known now as "OBD-I"). The aim of CARB was to encourage automobile manufacturers to design reliable emission control systems. CARB envisioned lowering vehicle emissions in California by denying registration to vehicles that did not pass the CARB vehicle emission standards. Unfortunately, OBD-I did not succeed at the time because the infrastructure for testing and reporting emissions-specific diagnostic information was not standardized or widely accepted. Technical difficulties in obtaining standardized and reliable emission information from all vehicles resulted in a systemic inability to effectively implement an annual emissions testing program.

OBD became more sophisticated after the initial implementation of OBD-I. OBD-II was a new standard introduced in the mid-1990s that implemented a new set of standards and practices developed by the Society of Automotive Engineers (SAE). These standards were eventually adopted by the EPA and CARB. OBD-II incorporates enhanced features that provide better engine monitoring technologies. OBD-II also monitors chassis parts, body and accessory devices, and includes an automobile diagnostic control network. OBD-II improved upon OBD-I in both capability and standardization. OBD-II specifies the type of diagnostic connector, pin configuration, electrical signaling protocols, messaging format and provides an extensible list of diagnostic trouble codes (DTCs). OBD-II also monitors a specific list of vehicle parameters and encodes performance data for each of those parameters. Thus, a single device can query the on-board computer(s) in any vehicle. This simplification of reporting diagnostic data led to the feasibility of the comprehensive emissions testing program envisioned by CARB.

The use of electrolytically-generated oxy-hydrogen gas has been known to supplement fuel combustion since the mid-18th Century. In 1766, Sir Henry Cavendish, a British scientist noted for his discovery of oxy-hydrogen or what he called "inflammable air", described the density of inflammable air, which formed water on combustion, in a 1766 paper entitled "On Factitious Airs". Antoine Lavoisier later reproduced Cavendish's experiment and gave the element its name (oxy-hydrogen). In 1918, Mr. Charles H. Frazer patented the first "Hydrogen Booster" system for internal combustion engines under U.S. Pat. No. 1,262,034. In his patent, Frazer stated that his invention "1—increases the efficiency of internal combustion engines. 2—Complete combustion of hydrocarbons. 3—Engine will stay cleaner. 4—Lower grade of fuel can be used with equal performance." In 1935, inventor Henry Garrett patented a electrolytic carburetor that enabled his automobile to run on tap water. Between 1943-1945, in response to the shortage of conventional fuel, the British army used oxy-hydrogen gas generators in their tanks, boats and other vehicles to get better mileage and to prevent engine overheating for vehicles used in Africa. They used generators which were very similar to many oxy-hydrogen generators. At the end of WWII, the British government ordered the removal and destruction of all such generators. In 1974, inventor Yull Brown (originally a Bulgarian Student named Ilya Velbov 1922-1998) from Australia filed a patent on his design of the 'Brown's Gas Electrolyzer'. In 1977, scientists and engineers at the NASA Lewis Research Center conducted a series of tests using a large block American-made V8 piston engine, fully instrumented and mounted on a dynamometer. Their research was focused on determining the effects exerted by introducing oxy-hydrogen gas to the combustion cycle of a typical ICE. The results of their studies were published in NASA TN D-8478 C.1, dated May 1977, in a white paper entitled "EMISSIONS AND TOTAL ENERGY CONSUMPTION OF A MULTICYLINDER PISTON ENGINE RUNNING ON GASOLINE AND A HYDROGEN-GASOLINE MIXTURE".

In 1983, Dr. Andrij Puharich obtained U.S. Pat. No. 4,394,230 entitled "Method and Apparatus for Splitting Water Molecules". His apparatus was independently tested by the Massachusetts Institute of Technology and found to operate at an energy efficiency rate in excess of eighty percent. In 1990, Mr. Juan Carlos Aquero was issued Letters Patent for an energy transforming system for internal combustion engines which uses Oxygen-oxy-hydrogen & steam, under European patent 0 405 919 A1. In 1990, Mr. Stanley A. Meyer was issued Letters Patent for a method for the production of a Oxygen-Hydrogen Fuel Gas Using a Dielectric Resonant Circuit, under U.S. Pat. No. 4,936,961—Jun. 26, 1990. In January 2006, TIAX published a white paper entitled "Application of Hydrogen-Assisted Lean Operation of Natural Gas-Fueled Reciprocating Engines" (HALO), a final scientific & technical report prepared under contract DE-FC26-04NT42235 with the US Department of Energy. The Abstract cites the following results—"Two key challenges facing Natural Gas Engines used for cogeneration purposes are spark plug life and high NOx emissions. Using Hydrogen Assisted Lean Operation (HALO), these two keys issues are simultaneously addressed. HALO operation, as demonstrated in this project, allows stable engine operation to be achieved at ultra-lean (relative air/fuel ratios of 2) conditions, which virtually eliminates NOx production. NOx values of 10 ppm (0.07 g/bhp-hr NO) for 8% (LHV H2/LHV CH4) supplementation at an exhaust 02 level of 10% were demonstrated, which is a 98% NOx emissions reduction compared to the leanest unsupplemented operating condition. Spark ignition energy reduction (which will increase ignition system life) was carried out at an oxygen level of 9%, leading to a NOx emission level of 28 ppm (0.13 g/bhp-hr NO). The spark ignition energy reduction testing found that spark energy could be reduced 22% (from 151 mJ supplied to the coil) with 13% (LHV H2/LHV CH4) oxy-hydrogen supplementation, and even further reduced 27% with 17% oxy-hydrogen supplementation, with no reportable effect on NOx emissions for these conditions and with stable engine torque output. Another important result is that the combustion duration was shown to be only a function of oxy-hydrogen supplementation, not a function of ignition energy (until the ignitability limit was reached). The next logical step leading from these promising results is to see how much the spark energy reduction translates into increase in spark plug life, which may be accomplished by durability testing." In 2006, Mr. Dennis J. Klein and Dr. Rugerro M. Santilli (USA) were awarded U.S. Patent Publication No. 2006/0075683 A1 for "Apparatus and method for the conversion of water into a new gaseous and combustible form and the combustible gas formed thereby." In 2007, under contract number NAS7-100, the Jet Propulsion Laboratory at Pasadena, Calif., issued a white paper entitled "Feasibility Demonstration of a Road Vehicle Fueled with Hydrogen-enriched Gasoline". Their research demonstrated that the addition of stoichiometric mixtures of oxy-hydrogen gas to gasoline combusted in a conventional ICE " . . . reduced NOx emissions and improved thermal efficiency."

However, these systems have several existing problems. One of the approaches involves generating oxy-hydrogen on a continual basis and storing the oxy-hydrogen for extraction when needed. However, electrically charging the generator plates requires too much of a standard alternator, thus a higher performance alternator is required. Also, consumers have been afraid of existing oxy-hydrogen systems due to the fact these systems constantly produce oxy-hydrogen and store it.

This potentially could create explosion concerns due to the stored oxy-hydrogen sitting in the automobile Several problems inhibit the effectiveness of adding oxy-hydrogen gas to supplement fuel combustion in conventional ICE's. None of the patented or commercially available oxy-hydrogen generators are computer controlled in a way that is compatible with OBD-II and OBD-III ECM systems. Further, existing oxy-hydrogen generators designed for use in automobiles generate substantial quantities of water vapor, which is intrinsically inimical to the ferrous components which comprise modern engines.

Accordingly, the current invention recognizes the need for an oxy-hydrogen gas generator system which supplies computer-controlled stoichiometric volumes of gas on-demand, does not require generation and storage of oxy-hydrogen gas for later use, is compatible with the operating parameters intrinsic to electronically controlled engine management modules, and does not generate a significant quantity of water vapor. The present invention fulfills these needs, and provides other related advantages.

SUMMARY OF THE INVENTION

The present invention is directed to an on-demand oxy-hydrogen generator for use in internal combustion engines. The oxy-hydrogen generator described by the present invention comprises a fluid reservoir containing an electrolyte solution. A cap configured to cover and seal, i.e., sealingly engage, an opening on the fluid reservoir has a positive terminal, a negative terminal, and a gas outlet. The gas outlet is in fluid communication with an interior of the fluid reservoir. A pair of electrode plates are attached to the cap and extend into the interior of the fluid reservoir so as to be at least partially submerged in the electrolyte solution. One of the pair of electrode plates is electrically coupled to the positive terminal and the other of the pair of electrode plates is electrically coupled to the negative terminal. Each of the pair of electrode plates preferably comprises a series of metal plates. The series of metal plates made from a metal selected from the group consisting of zinc, cadmium, gold, platinum, and palladium. The series of metal plates may also comprise a catalyst in an electrolysis reaction of water.

The electrolyte solution preferably comprises water mixed with an electrolytic salt, such as potassium nitrate, sodium bicarbonate, or the like. The oxy-hydrogen generator preferably comprises a secondary reservoir connected to the fluid reservoir by appropriate tubing or piping. The secondary reservoir contains additional electrolyte solution. The generator may also include a sensor configured to detect and regulate the level of the electrolyte solution in the fluid reservoir by supplying additional solution from the secondary reservoir.

An on-demand oxy-hydrogen fuel system for an internal combustion engine comprises a oxy-hydrogen generator as described above configured to electrolyze the electrolyte solution. The gas outlet on the oxy-hydrogen generator is configured to release oxy-hydrogen gas produced by the electrolysis of the electrolyte solution. The gas outlet is fluidly coupled to an intake manifold on the engine. A microcontroller is operably connected to the oxy-hydrogen generator and configured to selectively power the oxy-hydrogen generator in response to a demand for oxy-hydrogen.

The gas outlet is preferably fluidly coupled to a pollution control system configured to recycle blow-by gasses from a crankcase on the internal combustion engine to the intake manifold. The pollution control system preferably comprises a PCV valve in line with a vent line from the crankcase and a blow-by return line to the intake manifold. The gas outlet may be coupled to the vent line from the crankcase, the blow-by return line to the intake manifold, or the PCV valve. The microcontroller is also operably connected to the PCV valve and configured to regulate a flow rate of blow-by gasses through the PCV valve.

The positive and negative terminals of the oxy-hydrogen generator are preferably electrically connected to a power source of the engine. The power source may comprise a battery or an alternator.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
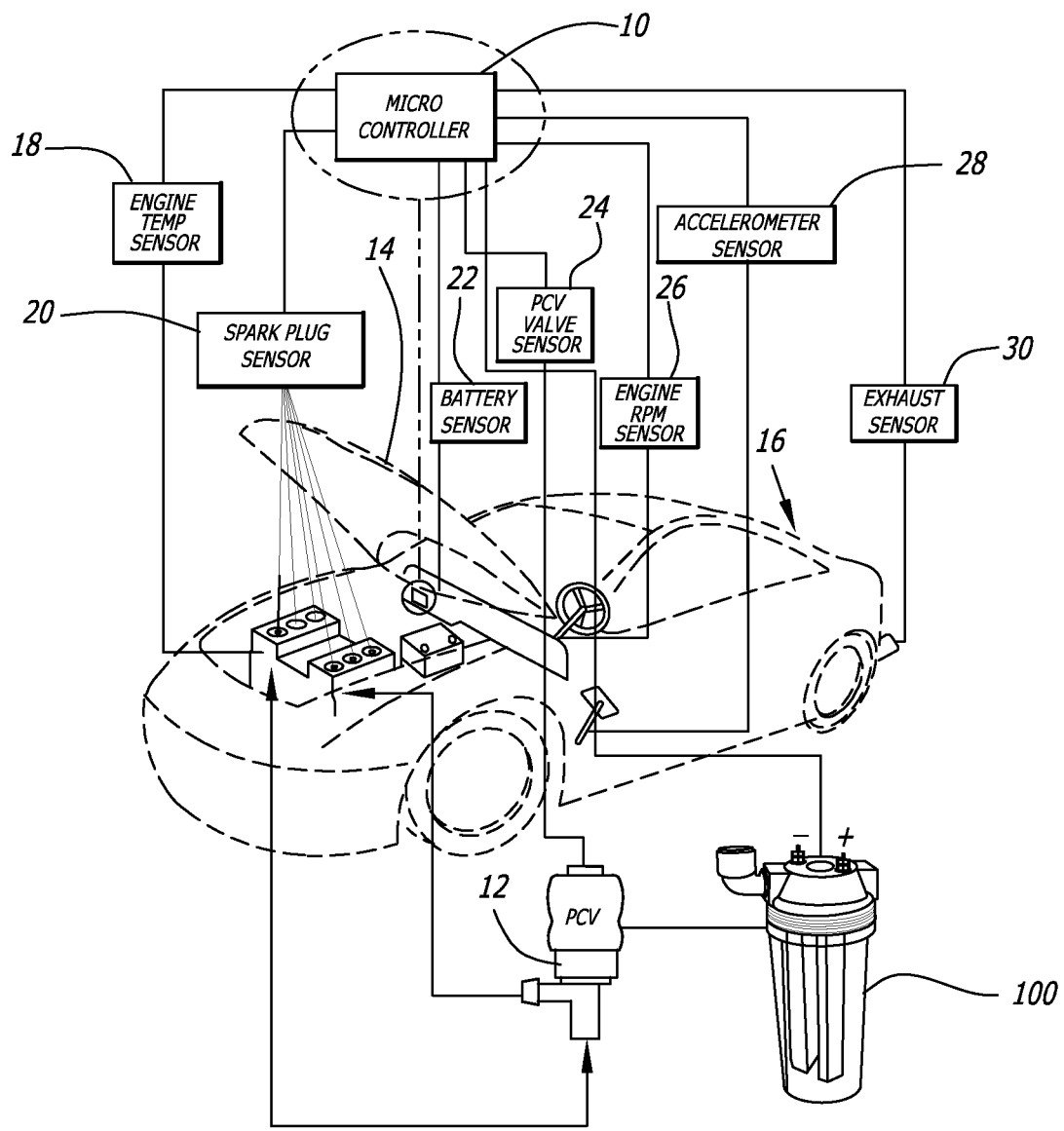
FIG. 1 is a schematic diagram of an automobile, illustrating various sensors as well as a microcontroller and a PCV valve and an on-demand oxy-hydrogen generator operably coupled to the PCV valve and microcontroller, in accordance with the present invention.

As shown in the drawings, for purposes of illustration, the present invention is directed to an on-demand oxy-hydrogen fuel system which is incorporated into a standard internal combustion engine. The oxy-hydrogen generator embodying the present invention is referred to generally by the reference number 100. In a particularly preferred embodiment, the oxy-hydrogen generator 100 of the present invention is incorporated into a pollution control system, such as that illustrated and described in U.S. Pat. No. 8,360,038, the contents of which are incorporated herein by reference, or U.S. application Ser. No. 61/754,384, the contents of which are also incorporated herein by reference. As such, the oxy-hydrogen generated by the system of the present invention is added to blow-by gases regulated by a microcontroller 10 and a PCV valve 12.

In FIG. 1, the microcontroller 10 is preferably mounted under a hood 14 of an automobile 16. The microcontroller 10 is electrically coupled to one or more of a plurality of sensors that monitor and measure real-time operating conditions and performance of the automobile 16. The microcontroller 10 regulates the flow rate of blow-by gases by regulating the engine vacuum in a combustion engine through digital control of a PCV valve 12. The microcontroller 10 receives real-time input from sensors that might include an engine temperature sensor 18, a spark plug sensor 20, a battery sensor 22, a PCV valve sensor 24, and engine RPM sensor 26, an accelerometer sensor 28, and an exhaust sensor 30. Data obtained from the sensors 18, 20, 22, 24, 26, 28, and 30 by the microcontroller 10 is used to regulate the PCV valve 12, as described in more detail below.

Figure 2:
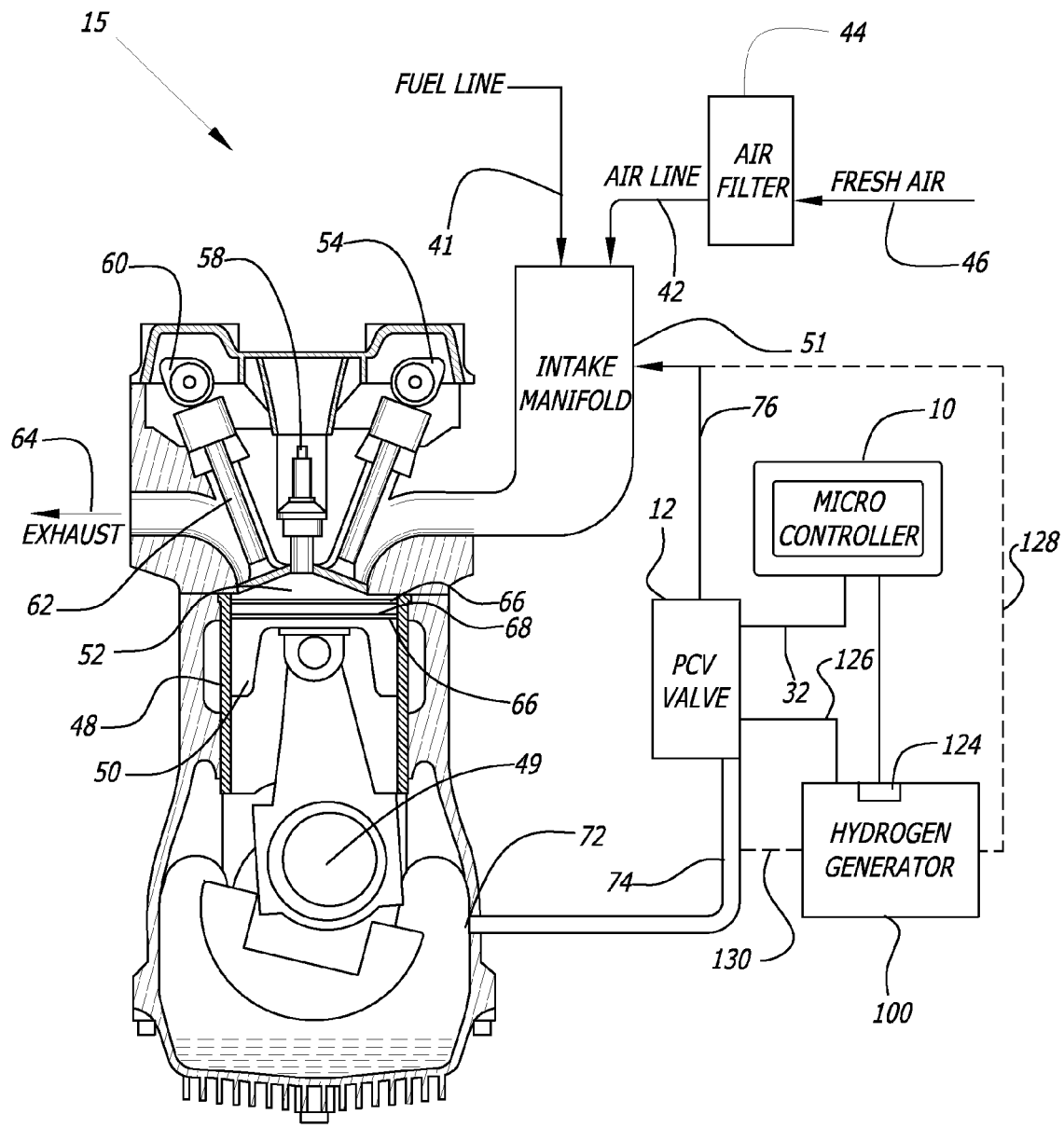
FIG. 2 is a diagrammatic cross-sectional view of an internal combustion engine illustrating the incorporation of the oxy-hydrogen generator of the present invention.

FIG. 2 is a schematic illustrating operation of the microcontroller 10 in conjunction with the PCV valve 12 in a car engine 15. As shown in FIG. 2, the PCV valve 12 is disposed between a crankcase 49, of an engine 15, and an intake manifold 51. In operation, the intake manifold 51 receives a mixture of fuel and air via a fuel line 41 and an air line 42, respectively. An air filter 44 may be disposed between the air line 42 and an air intake line 46 to filter fresh air before mixing with fuel in the intake manifold 51. The air/fuel mixture in the intake manifold 51 is delivered to a piston cylinder 48 as a piston 50 descends downward within the cylinder 48 from the top dead center. This creates a vacuum within a combustion chamber 52. Accordingly, an input camshaft 54 rotating at half the speed of the crankshaft 49 is designed to open an input valve 56 thereby subjecting the intake manifold 51 to the engine vacuum. Thus, fuel/air is drawn into the combustion chamber 52 from the intake manifold 51.

The fuel/air in the combustion chamber 52 is ignited by a spark plug 58 (in a gasoline engine). The rapid expansion of the ignited fuel/air in the combustion chamber 52 causes depression of the piston 50 within the cylinder 48. After combustion, an exhaust camshaft 60 opens an exhaust valve 62 to allow escape of the combustion gases from the combustion chamber 52 out an exhaust line 64. Typically, during the combustion cycle, excess exhaust gases slip by a pair of piston rings 66 mounted in the head 68 of the piston 50. These "blow-by gases" enter the crankcase 49 as high pressure and temperature gases. Over time, harmful exhaust gases such as hydrocarbons, carbon monoxide, nitrous oxide and carbon dioxide can condense out from a gaseous state and coat the interior of the crankcase 49 and mix with the oil 70 that lubricates the mechanics within the crankcase 49.

But, the PCV valve 12 is designed to vent these blow-by gases from the crankcase 49 to the intake manifold 51 to be recycled as fuel for the engine 15. This is accomplished by using the pressure differential between the crankcase 49 and the intake manifold 51. In operation, the blow-by gases exit the relatively higher pressure crankcase 49 through a vent 72 and travel through a vent line 74, the PCV valve 12, a blow-by return line 76 and into a relatively lower pressure intake manifold 51 coupled thereto. Accordingly, the quantity of blow-by gases vented from the crankcase 49 to the intake manifold 51 via the PCV valve 12 is digitally regulated by the microcontroller 10, which is connected to the PCV valve via connection wires 32. The microcontroller 10 is powered by a battery 11 and grounded at the ground connection 13.

In particular, venting blow-by gases based on engine speed and other operating characteristics of an automobile decreases the quantity of hydrocarbons, carbon monoxide, nitrogen oxide and carbon dioxide emissions. The PCV valve 12 and microcontroller 10 recycle gases by burning them in the combustion cycle. No longer are large quantities of the contaminants expelled from the vehicle via the exhaust. Hence, when installed in an automobile engine, the PCV valve 12 and microcontroller 10 are capable of reducing air pollution emissions for each automobile, increasing gas mileage per gallon, increasing horsepower performance, reducing engine wear (due to low carbon retention) and dramatically reducing the number of oil changes required.

In operation, the microcontroller 10 functions in three states. First, upon ignition of the vehicle, the microcontroller 10 causes the solenoid 80 in the PCV valve 12 to stay closed, as described above. This is because the engine 15 of the vehicle produces large quantities of pollution while still heating up. Once the engine 15 is properly heated, it functions more efficiently and produces less pollution. At that point, the microcontroller 10 enters the next state and functions as a window switch based on the engine RPM. While the engine is operating with a certain RPM range, the microcontroller 10 causes the solenoid 80 in the PCV valve 12 to open. Once the engine falls out of that RPM range, the solenoid 80 in the PCV valve 12 closes again. If the vehicle is being driven in conditions where the RPM stays in the given range for long periods of time (i.e. highway driving), then the microcontroller 10 activates a timing sequence so the vehicle's on-board diagnostics is prevented from introducing too much fuel into the engine. This timing sequence can be programmed to any interval, but in the preferred embodiment the sequence causes the solenoid 80 in the PCV valve 12 to be open for two minutes, then closed for 10 minutes. This sequence is repeated indefinitely until the engine RPM falls out of the given range.

While the logic of the preferred embodiment of the microcontroller 10 is based primarily on engine RPM, other embodiments of the microcontroller 10 may have logic based on other criteria. Such criteria may be engine temperature and engine torque, as well as crankcase pressure. Basing the microcontroller logic on these additional criteria makes for a control system that is more adjustable and programmable.

With reference to FIGS. 1 and 2, the oxy-hydrogen generator 100 of the present invention is operably coupled to the microcontroller 10 and the PCV valve 12. The microcontroller 10 is used to selectively power the oxy-hydrogen generator 100, causing the oxy-hydrogen generator 100 to generate oxy-hydrogen and create a flow of oxy-hydrogen into the PCV valve and/or the intake manifold 51 with the blow-by gases from the crankcase. The produced oxy-hydrogen is approximately 180 octane, and thus provides a very efficient fuel source that can dramatically increase fuel efficiency and reduce emissions.

Figures 3, 4:
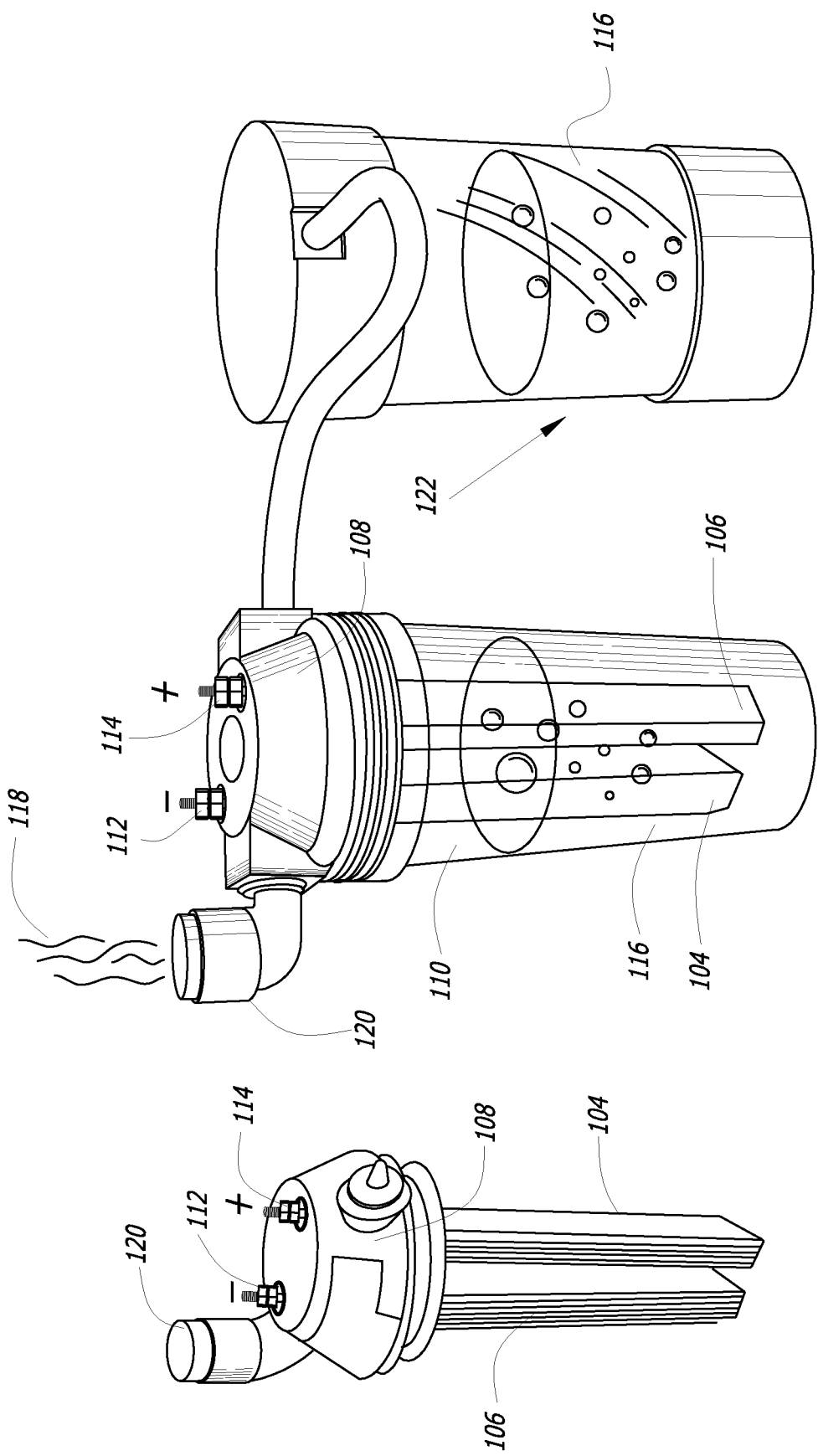
FIG. 3 is a perspective view of a cap and electrode plates of the oxy-hydrogen generator of the present invention.
FIG. 4 is a perspective view of a oxy-hydrogen generator embodying the present invention generating oxy-hydrogen, and coupled to an optional bubbler reservoir.

With reference now to FIG. 3, the oxy-hydrogen generator 100 comprises a series of metal plates 104 and 106, comprising anode and cathode electrodes. The metallic plates 104 and 106 can comprise any known metallic plates or anodes or cathodes which can be used for electrolysis of a water solution into oxy-hydrogen gas. Plating metals include zinc, cadmium, gold, platinum, palladium, and the like. The metal plates may serve as a catalyst or promoter to facilitate the rate of the chemical reaction of the water being turned into oxy-hydrogen gas and oxygen. Alternatively, the metal plates comprising the anode and cathode 104 and 106 merely serve to conduct electricity through the water solution to perform the electrolysis and electrically convert the water molecules to oxy-hydrogen and oxygen gas.

With reference to FIGS. 3 and 4, the oxy-hydrogen generator 100 includes a cap 108 which seals the top of a container 110. Electrodes or terminals 112 and 114, representing the cathode and anode, extend from electrical coupling to the plates 104 and 106 to the exterior of the cap 108 so as to be coupled to electrical wires from the electrical source of the internal combustion engine, such as the battery, alternator or the like.

Pure water is not a very effective conductor, and it would require that a large amount of electricity to be applied to the electrodes 112 and 114 in order to electrolyze the water into oxy-hydrogen. Thus, preferably, an electrolyte water solution is created, such as by adding an electrolytic salt—potassium nitrate, sodium bicarbonate (baking soda) or the like—to the water. This creates an effective electrolyte solution which requires much less electricity to cause the electrolysis of the water. As the plates 104 and 106 become electrically charged, they cause the electrolyte solution 116 to boil, creating oxy-hydrogen gas 118 in an upper portion of the oxy-hydrogen generator 100. This oxy-hydrogen gas 118 is channeled via outlet 120 to the intake manifold 51, either by means of the PCV valve 12 and/or introducing the oxy-hydrogen gas directly into the intake manifold 51 or plumbing the system such that it is combined with the blow-by gases from the crankcase before they enter the intake manifold 51. As mentioned above, the produced oxy-hydrogen is approximately 180 octane, and thus provides a very efficient fuel source for re-burning the blow-by gases so as to dramatically increase fuel efficiency and reduce emissions.

As illustrated in FIG. 4, the system of the present invention may incorporate a reservoir bubbler 122 having additional electrolyte solution 116 therein so as to refill and recharge the oxy-hydrogen generator 100 as the electrolyte solution levels decrease over time as gases are produced. However, the reservoir bubbler 122 does take up valuable space within the engine compartment. Thus, it is contemplated that the present invention include a sensor 124 in the oxy-hydrogen generator 100 which will alert the user when the water electrolyte solution level gets low. It is anticipated with normal use, the electrolyte water solution will only need to be filled every few months.

It will be appreciated by those skilled in the art that the present invention overcomes many of the concerns and disadvantages of existing and proposed automobile oxy-hydrogen systems. The system is "on-demand", and thus only generates oxy-hydrogen when it is needed. This is digitally controlled via the microcontroller 10, and thus there is no excess oxy-hydrogen that needs to be stored, which can create fire and explosion concerns or require safety precautions for safely storing the extra oxy-hydrogen, as with existing oxy-hydrogen generation systems.

The system of the present invention avoids issues relating to the automobile's fuel sensor. Fuel sensors are not calibrated to account for such a rich fuel source. However, bringing the oxy-hydrogen generated by the system of the present invention through a "back door" by mixing it with the blow-by effectively circumvents the automobile's fuel sensor.

Whereas existing oxy-hydrogen generator systems for automobiles are problematic as the oxy-hydrogen is generated with a large amount of water vapor, which gets into the engine and eventually causes rust, the present invention eliminates this concern as the PCV valve continually vents vapor out of the crankcase. Thus, the water vapor generated with the oxy-hydrogen is not in the crankcase or engine long enough to cause any serious rust concerns.

Although several embodiments have been described in detail for purposes of illustration, various modifications may be made without departing from the scope and spirit of the invention. Accordingly, the invention is not to be limited, except as by the appended claims.

What is claimed is:

1. An on-demand oxy-hydrogen fuel system for an internal combustion engine, comprising: an on-demand, oxy-hydrogen generator comprising a fluid reservoir containing an electrolyte solution, a cap for sealing an opening on the fluid reservoir, wherein the cap has a positive terminal, a negative terminal and a gas outlet in fluid communication with an interior of the fluid reservoir, and a pair of electrode plates attached to the cap and extending into the interior of the fluid reservoir so as to be at least partially submerged in the electrolyte solution, one of the pair of electrode plates electrically coupled to the positive terminal and another of the pair of electrode plates electrically coupled to the negative terminal; wherein the gas outlet on the oxy-hydrogen generator releases oxy-hydrogen produced by the electrolysis of the electrolyte solution, the gas outlet fluidly coupled to a pollution control system for recycling blow-by gases from a crankcase on the internal combustion engine to an intake manifold on the engine; and a microcontroller operably connected to the oxy-hydrogen generator for selectively activating the oxy-hydrogen generator in response to a demand for oxy-hydrogen, wherein the pollution control system comprises a PCV valve in-line with a vent line from the crankcase and a blow-by return line to the intake manifold.

2. An on-demand oxy-hydrogen fuel system for an internal combustion engine, comprising:
an on-demand, oxy-hydrogen generator comprising a fluid reservoir containing an electrolyte solution, a cap for sealing an opening on the fluid reservoir, wherein the cap has a positive terminal, a negative terminal and a gas outlet in fluid communication with an interior of the fluid reservoir, and a pair of electrode plates attached to the cap and extending into the interior of the fluid reservoir so as to be at least partially submerged in the electrolyte solution, one of the pair of electrode plates electrically coupled to the positive terminal and another of the pair of electrode plates electrically coupled to the negative terminal;
a pollution control system comprising a PCV valve in-line with a vent line from a crankcase on the internal combustion engine and a blow-by return line to an intake manifold on the internal combustion engine;
wherein the gas outlet on the oxy-hydrogen generator releases oxy-hydrogen produced by the electrolysis of the electrolyte solution, the gas outlet fluidly coupled to the pollution control system; and
a microcontroller operably connected to the oxy-hydrogen generator for selectively activating the oxy-hydrogen generator in response to a demand for oxy-hydrogen.

3. The on-demand oxy-hydrogen fuel system of any of claim 1 or 2, wherein the gas outlet is coupled to the vent line from the crankcase, the blow-by return line to the intake manifold, or the PCV valve.

4. The on-demand oxy-hydrogen fuel system of any of claim 1 or 2, wherein the microcontroller is operably connected to the PCV valve for regulating a flow rate of blow-by gases through the PCV valve.

5. The on-demand oxy-hydrogen fuel system of any of claim 1 or 2, wherein the positive and negative terminals of the oxy-hydrogen generator are electrically connected to a power source of the engine.

6. The on-demand oxy-hydrogen fuel system of claim 5, wherein the power source comprises a battery or an alternator.

7. The on-demand oxy-hydrogen fuel system of any of claim 1 or 2, wherein each of the pair of electrode plates comprise a series of metal plates.

8. The on-demand oxy-hydrogen fuel system of claim 7, wherein the series of metal plates are made from a metal selected from the group consisting of zinc, cadmium, gold, platinum, and palladium.

9. The on-demand oxy-hydrogen fuel system of claim 7, wherein the series of metal plates comprise a catalyst in an electrolysis reaction of water.

10. The on-demand oxy-hydrogen fuel system of any of claim 1 or 2, wherein the electrolyte solution comprises water mixed with an electrolytic salt.

11. The on-demand oxy-hydrogen fuel system of claim 10, wherein the salt comprises potassium nitrate or sodium bicarbonate.

12. The on-demand oxy-hydrogen fuel system of any of claim 1 or 2, further comprising a secondary reservoir containing additional electrolyte solution, the secondary reservoir fluidly connected to the fluid reservoir.

13. The on-demand oxy-hydrogen fuel system of any of claim 1 or 2, further comprising a sensor configured to detect a level of the electrolyte solution in the fluid reservoir.

\* \* \* \* \*